United States Patent [19]
Weisend, Jr.

[11] Patent Number: 5,310,142
[45] Date of Patent: May 10, 1994

[54] DIMPLE PATTERN PNEUMATIC DEICER ASSEMBLY

[75] Inventor: Norbert A. Weisend, Jr., Cuyahoga Falls, Ohio

[73] Assignee: The B. F. Goodrich Company, Akron, Ohio

[21] Appl. No.: 968,774

[22] Filed: Oct. 30, 1992

[51] Int. Cl.⁵ .............................................. B64D 15/16
[52] U.S. Cl. .............................. 244/134 A; 244/134 R
[58] Field of Search ........................ 244/134 R, 134 A

[56] References Cited

U.S. PATENT DOCUMENTS

| | | | |
|---|---|---|---|
| 1,998,809 | 4/1935 | Geer | 244/134 A |
| 2,025,919 | 12/1935 | Waner | 244/134 A |
| 2,173,262 | 9/1939 | Monegan et al. | 244/134 A |
| 2,204,122 | 6/1940 | Colley | 244/134 A |
| 2,436,889 | 3/1948 | Heston | 244/134 A |
| 2,438,693 | 3/1948 | Campbell | 244/134 A |
| 2,957,662 | 10/1960 | Hess | 244/134 R |
| 3,370,814 | 2/1968 | Kageorge et al. | 244/134 A |
| 4,463,919 | 8/1984 | Bac | 244/134 A |
| 4,494,715 | 1/1985 | Weisend, Jr. | 244/134 R |
| 4,561,613 | 12/1985 | Weisend, Jr. | 244/134 A |
| 4,613,102 | 9/1986 | Kageorge | 244/134 A |
| 4,687,159 | 8/1987 | Kageorge | 244/134 A |
| 4,779,823 | 10/1988 | Ely et al. | 244/134 A |
| 5,112,011 | 5/1992 | Weisend, Jr. et al. | 244/134 A |

FOREIGN PATENT DOCUMENTS

9741XI  3/1956  Fed. Rep. of Germany ... 244/134 R

Primary Examiner—Michael S. Huppert
Assistant Examiner—Anne E. Bidwell
Attorney, Agent, or Firm—Richard A. Romanchik

[57] ABSTRACT

A deicer assembly 32 for attachment to an airfoil includes a plurality of substantially parallel tube-like passages 36 formed by stitching parallel lines 78 through a pair of intermediate plies 52, 54. A zig-zag stitch line 76 criss-crosses the parallel tube lines 78 so that when the deicer is inflated by pressurized fluid a dimple matrix inflation pattern is formed.

31 Claims, 6 Drawing Sheets

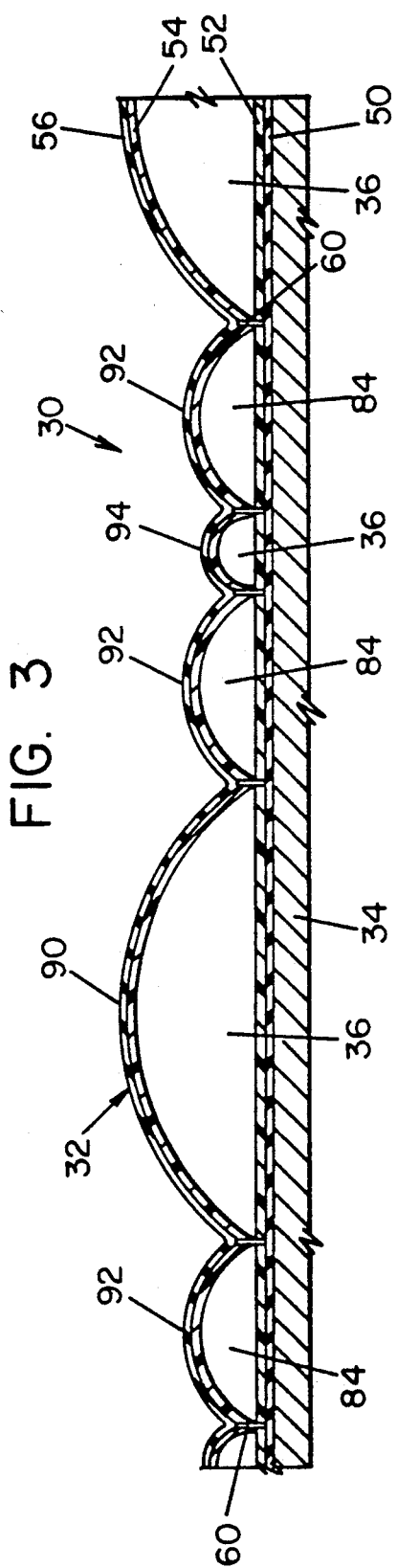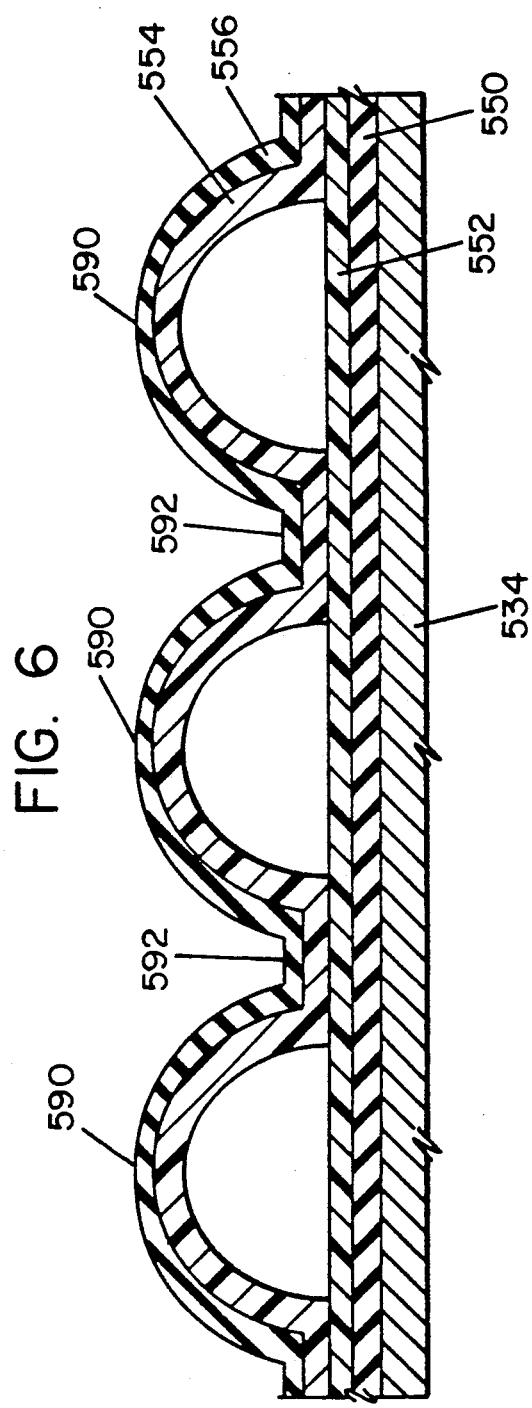

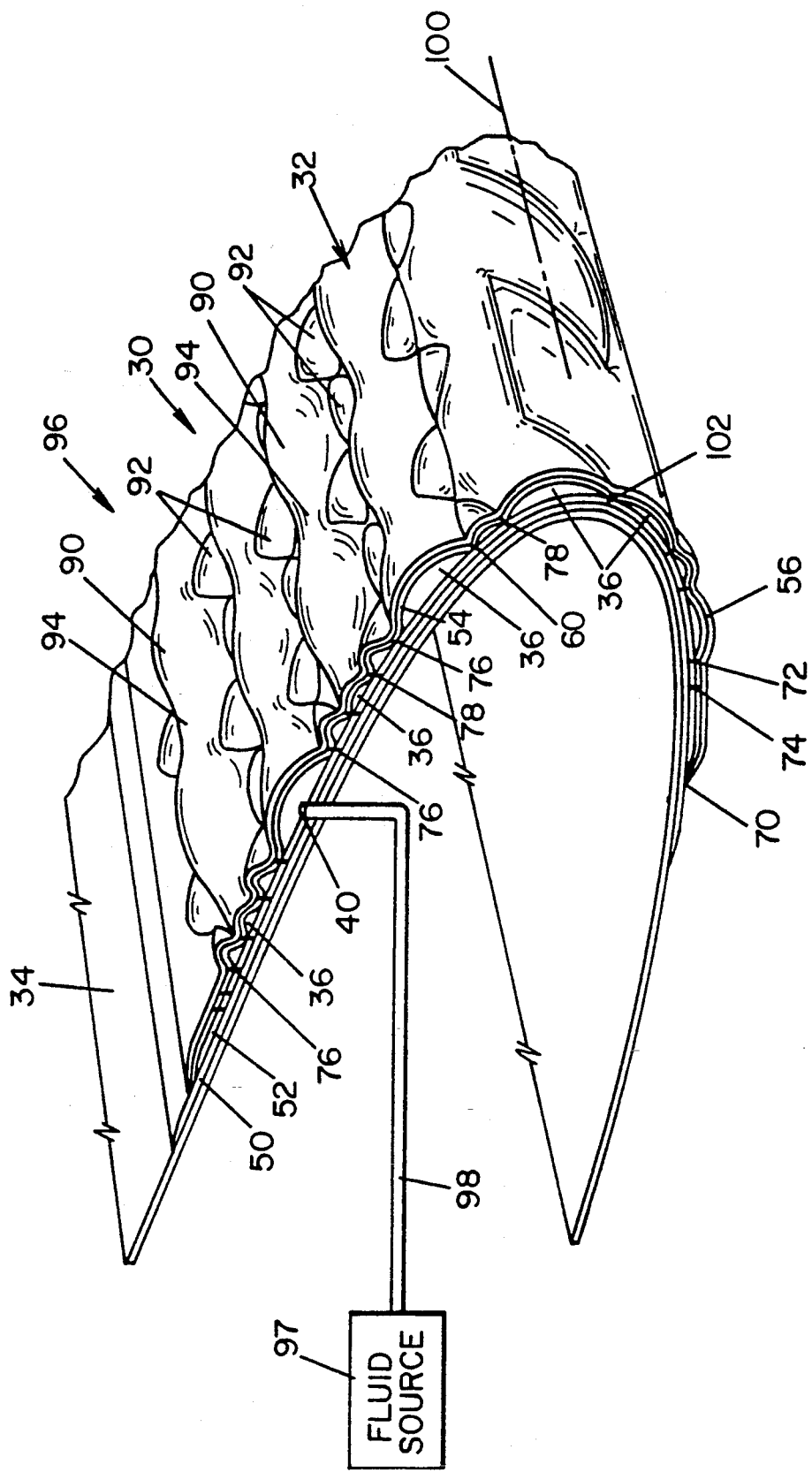

DIMPLE PATTERN PNEUMATIC DEICER ASSEMBLY

FIELD OF THE INVENTION

This invention relates to a pneumatic deicing system, and more particularly, a pneumatic deicing system having an improved expansion pattern suitable for improved deicing of aircraft surfaces.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing known as thermal de-icing, leading edges, are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from the aircraft component by the airstream passing over the aircraft. There are two popular methods of heating leading edges. In one approach known as electrothermal de-icing, an electrical heating element is placed in the leading edge zone of the aircraft component, either by inclusion in a elastomeric boot applied over the leading edge or by incorporation into the skin structure of the aircraft component. This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing. In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

The second commonly employed method for deicing involves chemicals. In limited situations, a chemical has been applied or supplied to all or part of an aircraft to depress adhesion forces associated with ice accumulation upon the aircraft or to depress the freezing point of water collecting upon surfaces of the aircraft.

The remaining commonly employed methods for deicing are typically termed mechanical de-icing. One mechanical means for effecting ice de-icing includes electromechanical hammering such as that described in U.S. Pat. No. 3,549,964 to Levin et al. Concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et al. One or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

The principal commercial mechanical de-icing means, however, is termed pneumatic de-icing wherein the leading edge zone or wing or strut component of an aircraft is covered with a plurality of expandable, generally tube-like structures, inflatable by employing a pressurized fluid, typically air, with the deicer being formed from compounds having rubbery or substantially elastic properties. Typically, the material forming the inflatable tubes on such de-icer structures can expand or stretch by 40% or more during an inflatable cycle, thereby causing a substantial change in the profile of the de-icer as well as in the leading edge to thereby crack ice accumulating on the leading edge. These conventional pneumatic de-icers require a volume of air to inflate their highly expandable tubes and the time for inflating such tubes typically and historically has averaged from about two and six seconds. The distortion of the airfoil profile caused by inflation of the tubes can substantially alter the airflow pattern over the airfoil and adversely affect the lift characteristics of the airfoil. The rubber or rubber-like materials forming these conventional pneumatic de-icers typically are possessed of a Young's modulus (modulus of elasticity) of approximately 6900 Kpa. The modulus of elasticity of ice is variously reported as being between about 275,000 Kpa and about 3,450,000 Kpa. Ice is known to be possessed of an elastic modulus enabling typical ice accumulations to adjust to minor changes in contours of surfaces supporting such ice accumulations. While the modulus of elasticity of rubber compounds used in conventional de-icers is much lower than the modulus of elasticity typically associated with ice accumulations. The large expansion of conventional pneumatic de-icers has functioned to crack or rupture the structure of the ice accumulations thereby allowing such accumulations to be swept away by impinging windstreams.

FIG. 1 illustrates a prior pneumatic deicer 12 formed from a composite having rubbery or substantially elastic properties. The deicer 12 is disposed on an airfoil 14. A plurality of tubes 16 are formed in the composite and are provided pressurized fluid, such as air, from a manifold 18. The manifold 18 is supplied fluid via a connector 20, which transfers fluid from a pressurized source (not shown). Connector 20 is integrated into the deicer 12 during manufacturing. Tubes 16 expand or stretch under pressure by 40% or more during inflation cycles, thereby causing a substantial change in the profile of the deicer (as well as the leading edge) to cause cracking of ice accumulating thereon.

Upon inflation, the tubular structures 16 of prior pneumatic deicers expand substantially along or parallel to the leading edge profile of the wing or strut and crack ice accumulating thereon for dispersal into the airstream passing over the aircraft component. The principal ice removing bending and shearing stresses are therefore exerted primarily in geometrical planes normal to the axis of the inflated tube radius. In geometrical planes containing the axis of the inflated tube radius, however, little or no principal ice removing stresses are produced. Efforts to improve such pneumatic impulse de-icing systems have led to continuing developments to improve their efficiency.

SUMMARY OF THE INVENTION

An object of the present invention is to provide a pneumatic deicing system which has a dimple matrix inflation pattern.

According to the present invention, a pneumatic deicing system is comprised of a flexible material or composite, and includes a plurality of tube-like members formed therein and arranged substantially parallel to one another, which expand or inflate when provided a pressurized fluid from a common manifold. A zig-zag stitching pattern is provided which overlaps the tube-like members so that when inflated, the tube-like members have a geometric pattern of dimples or depressions provided therein.

According to another aspect of the present invention, a pneumatic deicing system is comprised of a first ply of nonstretchable material and a second ply of stretchable material, wherein the first and second plies are attached in a geometric pattern of spaced apart points so that when the second ply is expanded by inflation with pressurized fluid, the attachment points form dimples in the inflated second ply.

The dimpled inflation pattern of the present invention provides stresses in accumulated ice in directions unavailable heretofore, thereby providing improved deicing capabilities. The present invention is economical to manufacture and facilitates customization of effective deicing capabilities to a wide variety of components.

These and other objects, features, and advantages of the present invention will become more apparent in light of the detailed description of exemplary embodiments thereof, as illustrated by the drawings.

BRIEF DESCRIPTION OF THE DRAWINGS

FIG. 3 is a cross sectional view taken along line 3—3 of FIG. 2, of a deicing system in accordance with the present invention.

FIG. 4 is an pictorial view, partly in cross section of a deicing system in accordance with the present invention.

FIG. 6 is a cross sectional view taken along line 6–6 of FIG. 5e.

BEST MODE FOR CARRYING OUT THE INVENTION

The present invention provides an apparatus for deicing an airfoil surface. By "deicing" what is meant is the removal of ice subsequent to formation of the ice upon the surface. By "leading edge" what is meant is that portion of a surface of a structure which functions to meet and in substantial measure break an air stream impinging thereon. Examples of leading edges would be forward edge portions of wings, stabilizers, struts, nacelles, propellers, rotating wings, tail rotors, and other housings, objects and protrusions first impacted by an air stream flowing over an aircraft in flight as well as spars, struts and other structural elements of marine vessels, towers and buildings.

Figure 1:
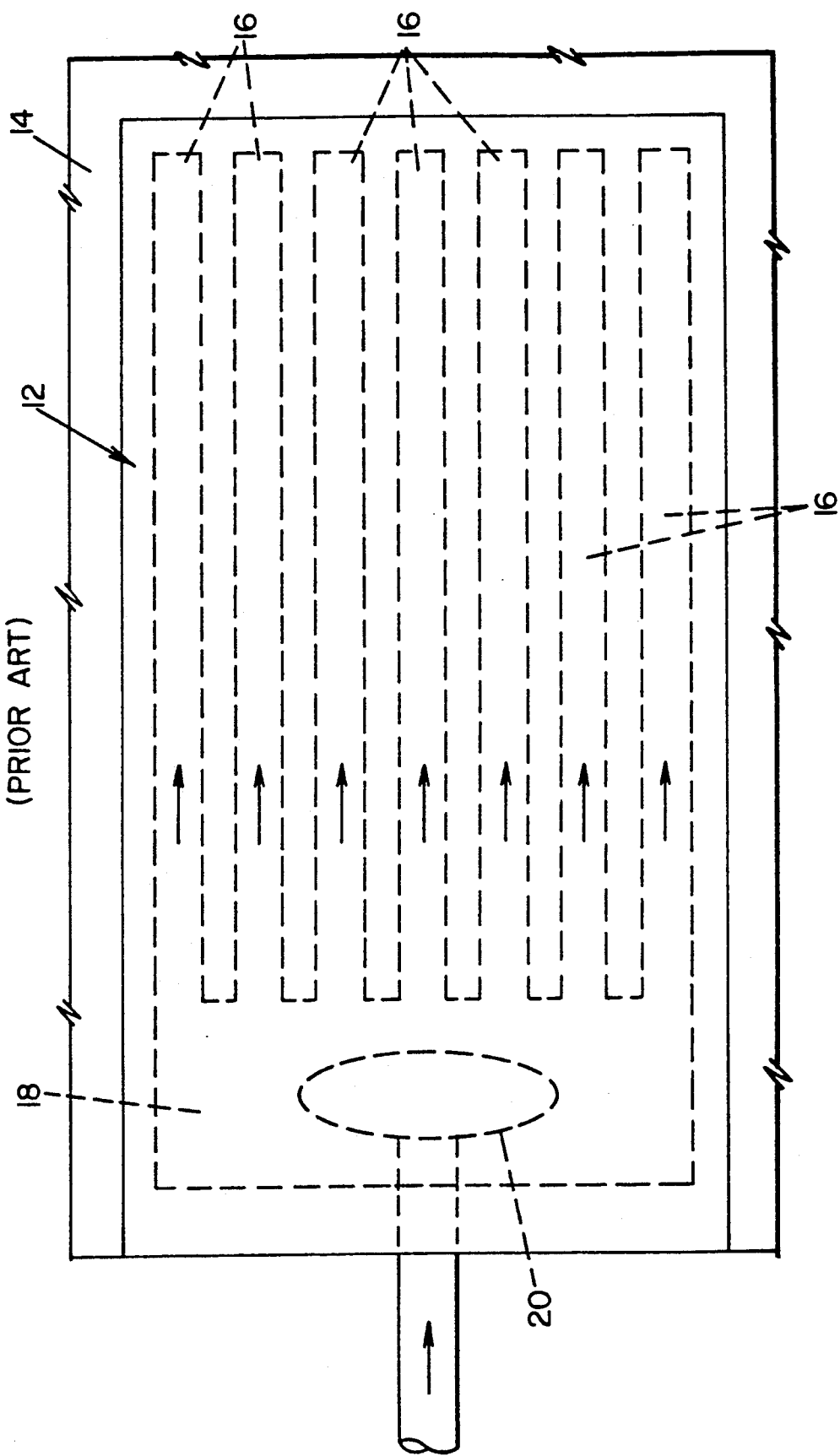
FIG. 1 is a top view of a prior art deicing system.
Figure 2:
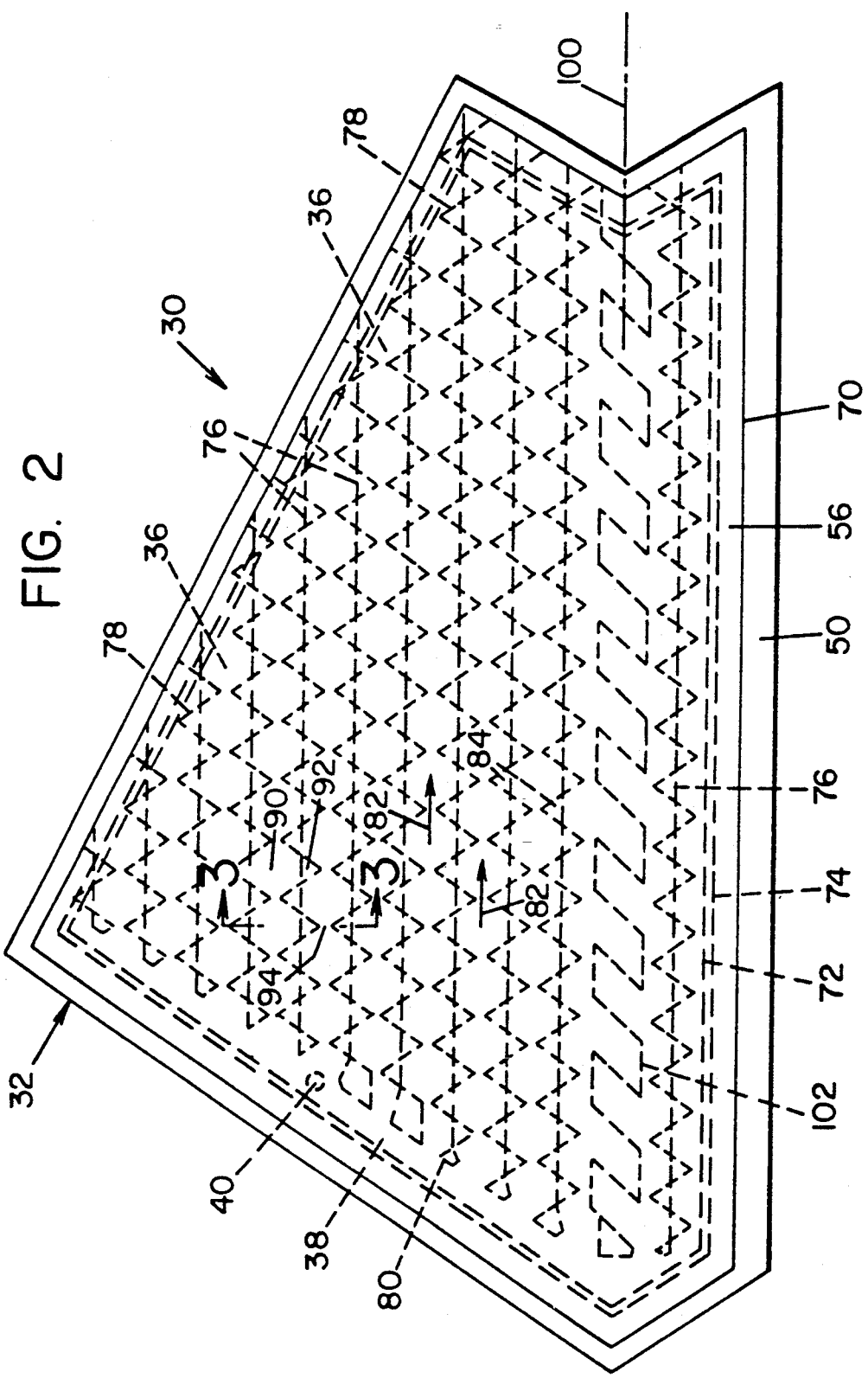
FIG. 2 is a developed top view of a deicing system in accordance with the present invention.

Referring now to FIGS. 2 and 3, wherein like reference numerals designate like or corresponding parts throughout different views, there is shown a deicing system 30 in accordance with the present invention which includes a deicer assembly 32 comprised substantially of a composite of flexible material. The deicer assembly 32 is formed as part and parcel of an airfoil skin 34 thereby defining the outer contour of the airfoil. The preferred method of integrating the deicer assembly 32 with the airfoil 34 is to provide an indentation (not shown) in the airfoil, manufacture the deicer assembly as a separate entity, and bond or attach the deicer assembly onto the airfoil at the location of the indentation. The preferred bonding means to attach a deicer assembly 32 to the airfoil 34 is to apply an adhesive, such as catalog number 1300L manufactured by the 3M corporation, to both contacting surfaces.

The principle inflatable portion of the deicer assembly 32 is a plurality of tube-like passages 36 formed therein and arranged substantially parallel to one another. Tube-like passages expand or inflate when provided a pressurized fluid, such as air. All inflatable tube-like passages 36 are fluidly connected at one end of deicer assembly 32 by a manifold 38 also formed therein. A plurality of zig-zag lines 78 criss-cross across the tube-like passages 36. Manifold 38 is provided pressurized fluid through a connector 40. The preferred construction for deicer assembly 32 is a composite, comprised from bottom (the side of material bonded to the airfoil ) to top of: a) a bottom layer or ply 50 of flexible material, such as neoprene; b) a first intermediate, non-stretchable layer or ply 52 of nonstretchable fabric such as nonstretchable nylon which is rubber coated on one side; c) a second intermediate, layer or ply 54 of stretchable fabric, such as stretchable nylon which is rubber coated one side; and, e) a top layer or ply 56 of a tough yet pliable weather impervious material, such as neoprene. An inflation pattern is created by sewing the fabric layers 52, 54 together in a predetermined pattern using thread 60. The deicer assembly 30 in FIG. 3 is illustrated in a fully inflated state. The preferred material for thread 60 is nylon or kevlar. All lines in FIG. 2 which are created by sewing thread 60 in this manner are illustrated as dotted lines. Layers 54–56 and 50–52 may be bonded together utilizing an appropriate cement, such as catalog number CHEMLOC 220 manufactured by the Lord Corporation. CHEMLOC is a registered trademark of the Lord Corporation.

Referring now to FIG. 2, a solid line 70 represents the outer edge of the top layer 56 of the deicer assembly 32. Dashed lines 72, 74 are stitches which represent the outer boundaries of pressurized fluid flow between intermediate layers 52, 54. Pressurized fluid is provided from a source (not shown) through connector 40. Substantially parallel, straight stitch lines 76 represent the stitches which form the inflatable tube-like passages 36, typically arranged substantially along or parallel to the leading edge profile of the airfoil to be deiced, although the lines may also be arranged in other orientations to the leading edge. A plurality of zig-zag stitch lines 78 are- provided which crisscross across the horizontal lines 76, with one zig-zag stitch 78 per horizontal line 76. Preferably, the zig-zag lines 78 are shaped similar to a saw tooth waveform to thereby form periodic triangular shaped areas 84 on both sides of each horizontal line 76. It is preferable that the horizontal lines 76 and the zig-zag lines 78 be merged or part of the same stitching pattern by forming loops 80 in the ends of horizontal and zig-zag stitches nearest the manifold 38 in order to prevent separation of the stitch. With this configuration, fluid flows into each tube-like passage 36 between the zig-zag stitch lines as illustrated by arrows 82. Air also flows across stitch lines 76, 78, thereby inflating triangular portions 84, although these portions do not inflate as much as the tube-like passages 36 because of the restricted fluid flow caused by the stitch lines. The inflation pattern created by the stitch pattern of the present invention is best described as "dimpled" or a dimple matrix pattern wherein there is a pattern of high inflated areas and low inflated areas, each inflated area being surrounded by stitch lines which form dimples, or inactive areas, the pattern appearing over the surface of the deicer assembly 32 when pressurized fluid is provided to connector 40. It is to be noted that stitch lines 72, 74, 76, 78 are stitches provided through layers 52 and 54 of the deicer assembly 32.

Referring now to FIG. 3, the dimple pattern consists of a series of high inflation points 90, lower inflated points 92 and lowest inflated points 94. The highest inflated points in the pattern are found over the middle of tube-like passages 36 where the distance between adjacent zig-zag stitches 78 is the greatest. The intermediate inflated points are at triangular areas 84. The lowest inflated points are found over the middle of tube-like passages 36 where the distance between adjacent zig-zag stitched 78 is the smallest. Points 90 are therefore higher than points 92 which are in turn higher than points 94.

The dimple pattern thus described produces ice removing stresses in all planes normal to the airfoil surface and improves deicing capabilities of the deicer assembly 32.

Referring now to FIG. 2, the deicer assembly 32 illustrated is configured for being positioned on both sides of a leading edge, represented by line 100. The section of deicer assembly 32 below line 100 would therefore be on one side of the leading edge and a section of deicer 32 found above line 100 would be placed on the opposite side of the airfoil 34. In this configuration, it is preferred that a zig-zag line 102 be sewn through intermediate layers 52, 54 across the leading edge line 100. The preferred pattern for stitch line 102 is what can be described as a slanted square wave. It can be seen that two tube-like passages 36 are provided on either side of the leading edge line 100 and on either side of stitch line 102. In this manner, a dimpled type inflation pattern can be provided directly across the leading edge 100 of the airfoil, thereby providing improved deicing characteristics directly on the leading edge 100 and improving deicing of the airfoil by initiating a wave of ice accretion starting from the leading edge 100 and spreading on both sides of airfoil 34.

Operation of the deicing system 30 is as follows. Pressurized fluid is provided by a source (not shown) through connector 40, into the manifold 38 and into each tube-like passage 36 and triangular area 84, wherein the modulus of elasticity of the material of deicer assembly 32 allows for expansion thereof, thereby causing a dimple textured airfoil surface which causes ice accumulated on top of the surface to be dislodged.

Referring now to FIG. 4, a deicing system 96 in accordance with the present invention includes a deicer assembly 32 attached to an airfoil 34. Deicer assembly 32 is comprised of a bottom layer or ply 50; a first intermediate, non-stretchable layer or ply 52; a second intermediate, stretchable layer or ply 54; and, a top layer or ply 56. Tube-like passages are formed by stitching layers 52 and 54 together in a predetermined pattern consisting of a plurality of parallel stitch lines 76, each parallel line having a zig-zag stitch line 78 which crisscrosses thereover. The combination of parallel straight lines 76 with zig-zag lines 78 creates a dimple type pattern when deicer assembly 32 is inflated by pressurized fluid provided from a fluid source 97 through a line 98. The dimple pattern has highest inflated points 90, intermediate inflated points 92 and lowest inflated points 94 between stitch lines 76, 78.

Referring now to FIGS. 5a–5e, wherein stitch patterns in accordance with a second, third, fourth, fifth, sixth and seventh embodiments of the present invention are generally similar to the stitch patterns illustrated hereinbefore in the previous figures and are thus indicated by references numerals corresponding to those discussed above, except that 100, 200, 300, 400, 500 and 600 "prefixes" are utilized.

Figure 5A:
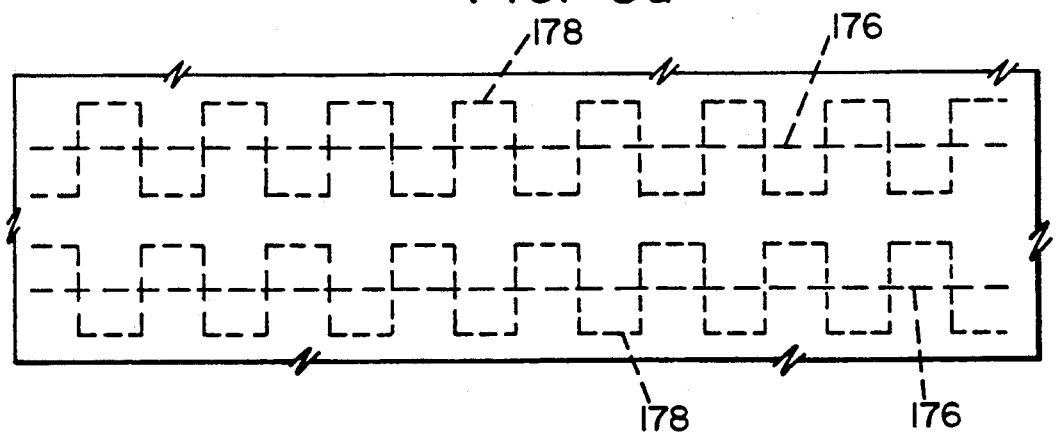
FIGS. 5a-5f are fragmentary top views of second, third, fourth, fifth, sixth and seventh embodiments of deicer assembly stitching patterns in accordance with the present invention.

In FIG. 5a, a second embodiment for the stitch pattern of the present invention includes a plurality of parallel horizontal lines 176 each having an overlapping zig-zag stitch 178, wherein the zig-zag stitch 178 has a square wave shape.

Figure 5B:
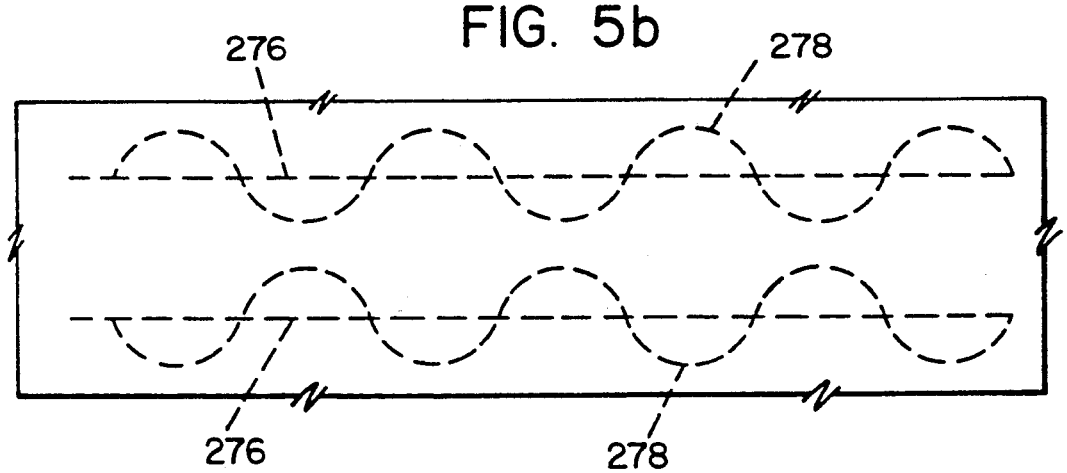

In FIG. 5b, a third embodiment for the stitch pattern of the present invention includes a plurality of parallel horizontal lines 276 each having an overlapping zig-zag stitch 278, wherein the zig-zag stitch 278 has a sine wave shape.

Figure 5C:
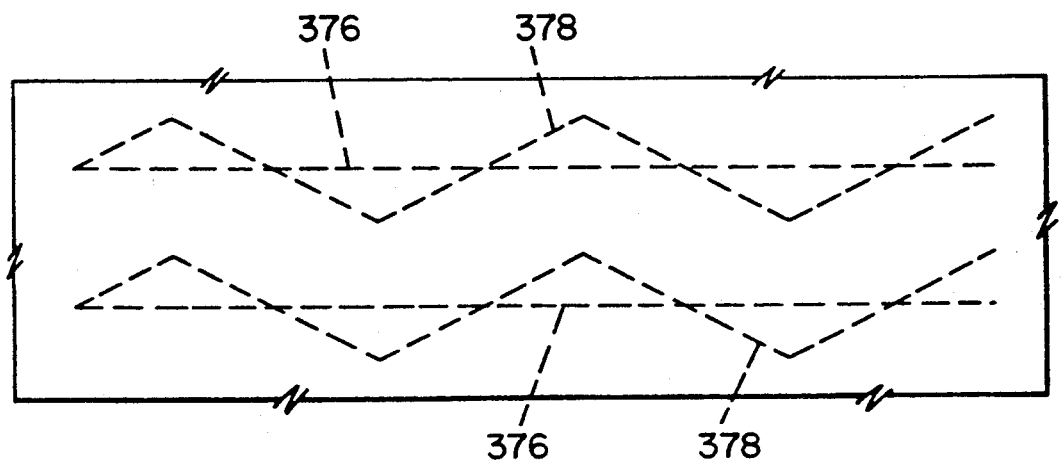

In FIG. 5c, a fourth embodiment for the stitch pattern of the present invention includes a plurality of parallel horizontal lines 276 each having an overlapping zig-zag stitch 378, wherein the zig-zag stitch 378 has a saw tooth wave shape. The zig-zag stitches 378 in FIG. 5c, however, are parallel to one another whereas adjacent zig-zag stitches 78, 178 and 278 described and illustrated hereinbefore are offset or out of phase with one another by about 180° or one half wave length.

Figure 5D:
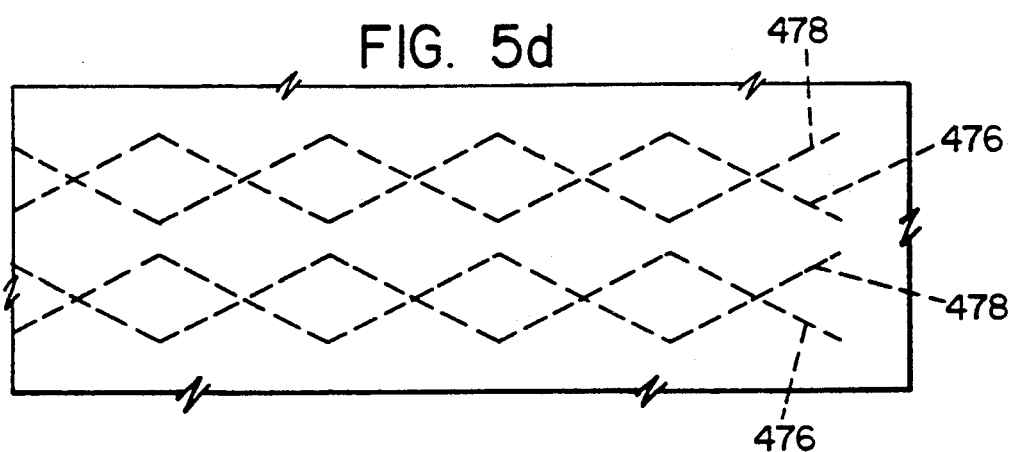

In FIG. 5d, a fifth embodiment for the stitch pattern of the present invention includes a plurality of parallel stitch lines 476 which are sewn in a periodic zig-zag pattern, such as the saw tooth wave illustrated. A second zig-zag stitch line 478, such as a saw tooth wave patterned line, criss crosses over the parallel lines 476.

Figure 5E:
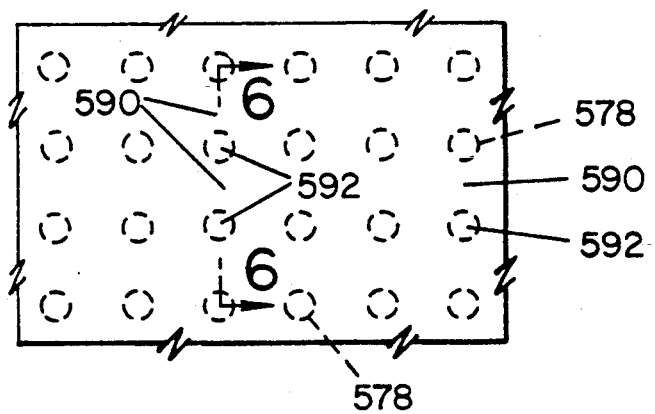

In FIG. 5e, a sixth embodiment for the stitch pattern of the present invention includes a plurality of small stitched circles 578 arranged in a pattern or matrix. The stitched circles provide inactive points 92 between the high inflation points 590 when the deicer assembly is inflated.

Figure 5F:
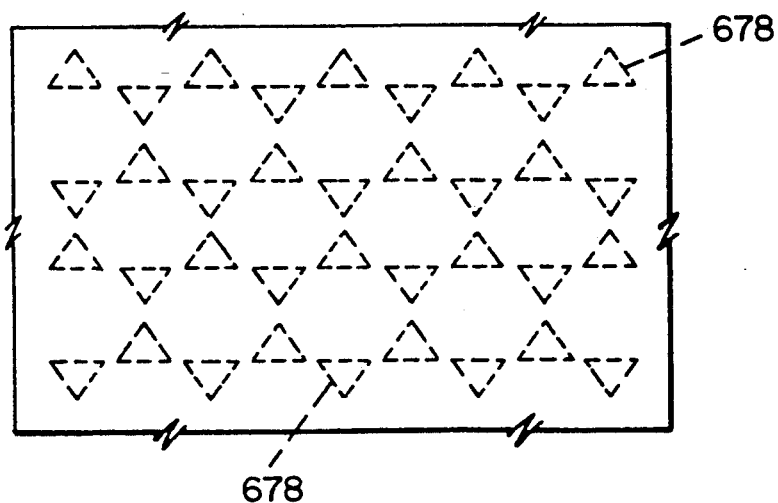

In FIG. 5f, a seventh embodiment for the stitch pattern of the present invention includes a plurality of small stitched triangles 678 arranged in a pattern or matrix.

It can be seen that the embodiments illustrated in FIGS. 5e and 5f do not have parallel horizontal stitch lines (e.g. 76, 176, 276, 376, 476) as previously described embodiments. When the deicer is inflated, dimples or inactive areas are formed in FIGS. 5e and 5f by the circular or triangular attachment points. Although stitching is the preferred method of attachment to create the inactive areas, other attachment methods may be utilized. For instance, a cement or glue may be utilized to bond the intermediate layers for this purpose.

Referring now to FIG. 6, wherein a deicing assembly in accordance with a sixth embodiment of the present invention consists of a series of high inflation points 590 and inactive areas 592. The deicer assembly in FIG. 6 is illustrated in a fully inflated state, and is comprised of layers 550–556. For exemplary purposes, layers 552 and 554 are illustrated in FIG. 6 as being attached at inactive areas 592 with a bonding agent rather than stitching. The assembly is mounted on an airfoil 534.

It is to be noted that the scope of the present invention is not to be limited by the particular stitch patterns illustrated and that other patterns not shown hereinbefore may be utilized for similar deicing results.

Although the invention has been shown and described with exemplary embodiments thereof, it should be understood by those skilled in the art that the foregoing and various other changes, omissions and additions may be made therein and thereto without departing with the spirit and the scope of the invention.

What is claimed:

1. An apparatus for removing ice from an airfoil utilizing pressurized fluid, said apparatus comprising,
a bottom layer of a first fabric;
a top layer of a stretchable second fabric;
said top and bottom layers being stitched together in a predetermined pattern comprising a plurality of substantially parallel stitch lines and a zig-zag stitch line provided along each of at least two adjacent ones of said plurality of substantially parallel stitch lines, said plurality of substantially parallel stitch lines forming a plurality of tube-like passages which are inflated by the fluid, each said zig-zag stitch line forming a zig-zag pattern,
wherein the pressurized fluid is communicated across said stitch lines, said stitch lines thereby providing a plurality of dimples in said tube-like passages when said tube-like passages are inflated.

2. An apparatus for removing ice from an airfoil utilizing pressurized fluid according to claim 1, wherein each said zig-zag stitch line is substantially parallel to any adjacent said zig-zag stitch line.

3. An apparatus for removing ice from an airfoil utilizing pressurized fluid according to claim 1, wherein each zig-zag pattern is offset from any adjacent said zig-zag pattern.

4. An apparatus for removing ice from an airfoil utilizing pressurized fluid according to claim 1, wherein each said zig-zag pattern is a substantially similar cyclical pattern and each zig-zag pattern is offset from any adjacent said zig-zag pattern on the order of 180°.

5. An apparatus for removing ice from an airfoil utilizing pressurized fluid according to claim 1, wherein said zig-zag pattern is saw-tooth wave shaped.

6. An apparatus for removing ice from an airfoil utilizing pressurized fluid according to claim 1, wherein said zig-zag pattern is sine wave shaped.

7. An apparatus for removing ice from an airfoil utilizing pressurized fluid according to claim 1, wherein said zig-zag pattern is rectangular wave shaped.

8. An apparatus for removing ice from an airfoil utilizing pressurized fluid according to claim 1, wherein said bottom layer is comprised of nonstretchable nylon and said top layer is comprised of stretchable nylon.

9. An apparatus for removing ice from an airfoil utilizing pressurized fluid according to claim 1, further comprising:
a base layer disposed beneath and attached to said bottom layer; and,
a surface layer disposed above and attached to said top layer.

10. An apparatus for removing ice from an airfoil utilizing pressurized fluid according to claim 1, further comprising:
a base layer comprised of a first elastomer and disposed beneath and attached to said bottom layer; and,
a surface layer comprised of a second elastomer and disposed above and attached to said top layer.

11. A pneumatic deicing system according to claim 1, further comprising connection means for providing the pressurized fluid in communication with said tube-like passages.

12. A pneumatic deicing system comprising:
an airfoil to be deiced;
fluid source means for providing pressurized fluid;
a bottom layer of a first fabric attached to said airfoil;
a top layer of a stretchable second fabric;
said top and bottom layers being stitched together in a predetermined pattern comprising a plurality of substantially parallel stitch lines and a zig-zag stitch line provided along each of at least two adjacent ones of said plurality of substantially parallel stitch lines, said plurality of substantially parallel stitch lines forming a plurality of tube-like passages which are inflated by the fluid, each said zig-zag stitch line forming a zig-zag pattern,
wherein the pressurized fluid is communicated across said stitch lines, said stitch lines thereby providing a plurality of dimples in said tube-like passages when said tube-like passages are inflated.

13. A pneumatic deicing system according to claim 12, wherein each said zig-zag stitch line is substantially parallel to any adjacent said zig-zag stitch line.

14. A pneumatic deicing system according to claim 12, wherein each zig-zag pattern is offset from any adjacent said zig-zag pattern.

15. A pneumatic deicing system according to claim 12, wherein each said zig-zag pattern is a substantially similar cyclical pattern and each zig-zag pattern is offset from any adjacent said zig-zag pattern on the order of 180°.

16. A pneumatic deicing system according to claim 12, wherein said zig-zag pattern is saw-tooth wave shaped.

17. A pneumatic deicing system according to claim 12, wherein said zig-zag pattern is sine wave shaped.

18. A pneumatic deicing system according to claim 12, wherein said zig-zag pattern is rectangular wave shaped.

19. A pneumatic deicing system according to claim 12, wherein said bottom layer is comprised of nonstretchable nylon and said top layer is comprised of stretchable nylon.

20. A pneumatic deicing system according to claim 12, further comprising:
a base layer disposed beneath and attached to said bottom layer; and,
a surface layer disposed above and attached to said top layer.

21. A pneumatic deicing system according to claim 12, further comprising:

a base layer comprised of a first elastomer and disposed beneath and attached to said bottom layer; and, a surface layer comprised of a second elastomer and disposed above and attached to said top layer.

22. A pneumatic deicing system according to claim 12, further comprising connection means for providing the pressurized fluid in communication with said tube-like passages.

23. An apparatus for removing ice from an airfoil utilizing pressurized fluid, said apparatus comprising:

a bottom layer of a first fabric;

a top layer of a stretchable second fabric for expanding away from said bottom layer; and, a plurality of attachment means for attaching said top and bottom layers together at isolated points, such that said top layer is able to expand away from said bottom layer 360° around said isolated points, thereby creating a dimple at each one of said isolated points when said top layer is expanded away from said bottom layer by the pressurized fluid, said attachment means being arranged in a predetermined pattern.

24. An apparatus for removing ice from an airfoil utilizing pressurized fluid according to claim 23, wherein said attachment means is comprised of stitching.

25. An apparatus for removing ice from an airfoil utilizing pressurized fluid according to claim 23, wherein said attachment means is comprised of stitching small circles.

26. An apparatus for removing ice from an airfoil utilizing pressurized fluid according to claim 23, wherein said attachment means is comprised of stitching small triangles.

27. An apparatus for removing ice from an airfoil utilizing pressurized fluid according to claim 23, wherein said attachment means is comprised of an adhesive.

28. A pneumatic deicing system according to claim 23, wherein said bottom layer is comprised of non-stretchable nylon and said top layer is comprised of stretchable nylon.

29. A pneumatic deicing system according to claim 23, further comprising:

a base layer disposed beneath and attached to said bottom layer; and, a surface layer disposed above and attached to said top layer.

30. A pneumatic deicing system according to claim 23, further comprising:

a base layer comprised of a first elastomer and disposed beneath and attached to said bottom layer; and, a surface layer comprised of a second elastomer and disposed above and attached to said top layer.

31. A pneumatic deicing system according to claim 23, further comprising connection means for providing the pressurized fluid between said top and bottom layers.

* * * * *